(12) United States Patent
Taoka et al.

(10) Patent No.: US 7,740,311 B2
(45) Date of Patent: Jun. 22, 2010

(54) CAR SEAT

(75) Inventors: Yoshifumi Taoka, Hyogo (JP); Tetsurou Ushijima, Osaka (JP)

(73) Assignee: Daihatsu Motor Co., Ltd., Osaka (JP)

( * ) Notice: Subject to any disclaimer, the term of this patent is extended or adjusted under 35 U.S.C. 154(b) by 518 days.

(21) Appl. No.: 10/587,961

(22) PCT Filed: Dec. 7, 2004

(86) PCT No.: PCT/JP2004/018201

§ 371 (c)(1),
(2), (4) Date: Jul. 31, 2006

(87) PCT Pub. No.: WO2005/073017

PCT Pub. Date: Aug. 11, 2005

(65) Prior Publication Data

US 2007/0132286 A1 Jun. 14, 2007

(30) Foreign Application Priority Data

Feb. 2, 2004 (JP) ............................. 2004-025672

(51) Int. Cl.
*B60N 2/42* (2006.01)
(52) U.S. Cl. ............................... 297/216.1; 297/284.11
(58) Field of Classification Search ............ 297/284.11, 297/378.11, 216.1, 312, 313, 339
See application file for complete search history.

(56) References Cited

U.S. PATENT DOCUMENTS

| 2,660,222 | A | * | 11/1953 | Woodsworth | .......... | 297/216.18 |
| 4,225,178 | A | * | 9/1980 | Takada | .................... | 297/216.1 |
| 4,429,919 | A | * | 2/1984 | Klueting et al. | ........ | 297/378.11 |
| 5,125,472 | A | | 6/1992 | Hara | | |
| 6,109,690 | A | * | 8/2000 | Wu et al. | ................ | 297/216.13 |
| 6,386,631 | B1 | | 5/2002 | Masuda et al. | | |
| 6,557,935 | B2 | * | 5/2003 | Choi | ........................ | 297/216.1 |
| 2004/0075313 | A1 | | 4/2004 | Taoka et al. | | |

FOREIGN PATENT DOCUMENTS

| EP | 1 362 737 | | 11/2003 |
| JP | 5-178137 | | 7/1993 |
| JP | 5-238297 | | 9/1993 |
| JP | 05286387 A | * | 11/1993 |
| JP | 6-500748 | | 1/1994 |
| JP | 2000-1136 | | 1/2000 |
| JP | 2004-9997 | | 1/2004 |
| WO | WO- 2002-066285 | | 8/2002 |

* cited by examiner

*Primary Examiner*—David Dunn
*Assistant Examiner*—Tania Abraham
(74) *Attorney, Agent, or Firm*—Jordan and Hamburg LLP

(57) ABSTRACT

In a front part inside a seat cushion are arranged a catching member extending in a widthwise direction of the seat cushion and movable up and down, and inertial force transmission means for moving the catching member upward by the inertial force that acts on an inertial mass at the time of rapid deceleration. When a passenger sits on the seat cushion, the catching member moves down so as not to deteriorate the seat comfort, and at the time of rapid deceleration, the catching member moves up and stops the passenger's hips from moving forward. Thus it is reliably prevented that the passenger moves forward, without deteriorating the seat comfort, and the design is simple, lightweight, and low-cost.

11 Claims, 10 Drawing Sheets

CAR SEAT

TECHNICAL FIELD

The present invention relates to a car seat, and more particularly to a car seat that prevents the passenger from moving forward when the car is suddenly decelerated.

BACKGROUND ART

Conventionally, seat belts are provided as means of preventing passengers from moving forward by the force of inertia when the car is suddenly decelerated. One problem, however, was that seat belts did not work effectively when the passengers' hips move forward as they sink into seat cushions.

To prevent passenger's hips from moving forward, it has been proposed to provide a cross member such as a pipe inside the seat cushion bridged across the width of the seat cushion in a position forward of the hips of the passenger in a normal seated position. With this approach, the cross member catches the passenger's hips, so that shock is absorbed by the deformation of the cross member and that the passenger's forward movement is restricted.

However, there is a problem that such a cross member in the front part of the seat cushion will make the seated passenger uncomfortable and deteriorate driving comfort, but on the other hand if the cross member is positioned lower enough so as not to affect seat comfort, then the effect of preventing the passenger from moving forward will not be achieved.

Another approach is proposed, for example, in Japanese Patent Publication No. 5-238297: Seat cushion lift-up means is provided inside in the front part of the seat cushion, and a movable member is provided, which moves with the hips of the passenger when the vehicle is suddenly decelerated, the movable member being linked to the seat cushion lift-up means so that the front end of the seat cushion is lifted up with the movement of the movable member. Yet another design is known, as disclosed in Japanese Patent Publication No. 2000-1136, wherein a cross member is arranged to be in a lower position in normal conditions, and when a collision is detected by a sensor or the like, a power generating device including gas generating means is activated so as to lift up the cross member through suitable means such as a link mechanism.

Further, the applicant of the present invention has previously proposed a design, as shown in the International Publication No. WO02/066285, wherein a catching part that extends to the left and right of the seat cushion is arranged inside the seat cushion such as to be movable up and down, with means of biasing the catching part upwards being provided, and a locking member is activated by inertia at the time of rapid deceleration so as to lock the catching part from moving down so that the passenger is stopped from moving forward by the catching member.

However, with the design shown in Japanese Patent Publication No. 5-238297, the seat cushion lift-up means and movable member, as well as means of linking these, are required, because of which the structure is large, complex, and expensive. Another problem is that the movable member adversely affects the seat comfort.

With the design shown in Japanese Patent Publication No. 2000-1136, the mechanism for lifting up the cross member forcibly when necessary and its drive means are required, because of which the system is complex and expensive, and also heavy.

With the design shown in the International Publication No. WO02/066285, the structure is simple and the seat comfort when the passenger sits down is not bad; however, there is a possibility that, when the passenger's hips move forward in a front collision, the catching member may slip down due to a downward force component of the load applied to the catching member, because of which there is a reliability problem in the effect of preventing forward movement of the passenger.

Objects of the present invention are to solve the above-described problems in the conventional techniques and to provide a simple design, lightweight, and low-cost car seat which reliably restricts passenger's forward movement when the car is suddenly decelerated, without deteriorating seat comfort.

DISCLOSURE OF THE INVENTION

The car seat of the present invention includes, in a front part inside the seat cushion, a catching part extending in a widthwise direction of the seat cushion and arranged such as to be movable up and down, and inertial force application means that is activated by an inertial force at the time of rapid deceleration to move the catching part upward. With this design, when a passenger sits on the seat cushion, the catching part moves down easily by the pressure from above, so that any feeling that there is something underneath is reduced and the seat comfort is not deteriorated, and in the event of rapid deceleration caused by a front collision, the inertial force application means is activated and the catching part is moved upward by inertia, so that any forward movement of the passenger's hips is stopped by this catching part, and thus it is reliably prevented that the passenger moves forward, and since there are no lift-up mechanism or drive means, the structure is simple, lightweight, and low-cost.

The catching part is supported by a reinforcing member inside the seat cushion such that it is swingable up and down around a pivot shaft on the rear side of the vehicle relative to the pivot shaft, and the inertial force application means includes an inertial mass part arranged forward of the catching part and its pivot shaft and above the pivot shaft, and a coupling part for connecting the inertial mass part and the catching part. Thereby, the catching part moves upward as well as forward so that it easily catches the passenger's hips moving forward during rapid deceleration, and also because the inertial mass application means is arranged forward of and above the pivot shaft, the entire mechanism is made compact in the up and down direction and readily accommodated inside the seat. Moreover, since the moment of inertia on the catching part and on the inertial mass part changes mutually complementarily during rapid deceleration, the catching part is moved upward by inertia stably throughout the swing.

The catching part may be coupled to a support spring member that supports the lower side of the seat cushion, using an elastic member having a smaller maximum tension force than the inertial force that acts during rapid deceleration. Thereby, when the passenger sits on the seat, the seat cushion displaces downward and the support spring member is flexed, pulling the catching part downward through the elastic member, whereby it is more reliably prevented that the passenger feels there is something underneath when s/he sits down because of the catching part, while the performance for stopping the passenger's motion during rapid deceleration is achieved.

Locking means may be provided for stopping downward movement of the catching part that has been moved upward by the inertial force during rapid deceleration, so that the catching part remains in its upward position and does not move down and the effect of catching the passenger's hips is achieved in a stable manner, whereby it is reliably prevented that the passenger moves forward.

The catching part and the inertial mass part are coupled together and supported by a support member; the locking means may be composed of a locking member that is always kept in contact with this support member with biasing means, and an engagement portion formed to the support member to be engaged with the locking member when the catching part moves more than a predetermined distance. Thereby, as the locking member is always kept in contact with the support member, it responds immediately to any sudden movement of the catching part so that the passenger is reliably stopped from moving forward, and also, as the support member and the locking member are in contact with each other, the design is compact.

The support member may have two extensions from the pivot shaft toward the catching part side and the inertial mass part side, the latter being substantially J-shaped when viewed from one side of the vehicle. The locking member may be arranged on the front side of the vehicle relative to the support member, a curved portion at the front end of the letter J of the support member forming an engagement portion to be engaged with the locking member. Thereby, the support member need not be provided with an additional component to form the engagement portion, and the design is made simpler and compact, while the locking effect is reliably achieved.

BEST MODE FOR CARRYING OUT THE INVENTION

Preferred embodiments of the car seat of the present invention will be hereinafter described with reference to FIG. 1 to FIG. 10D.

Figure 1:
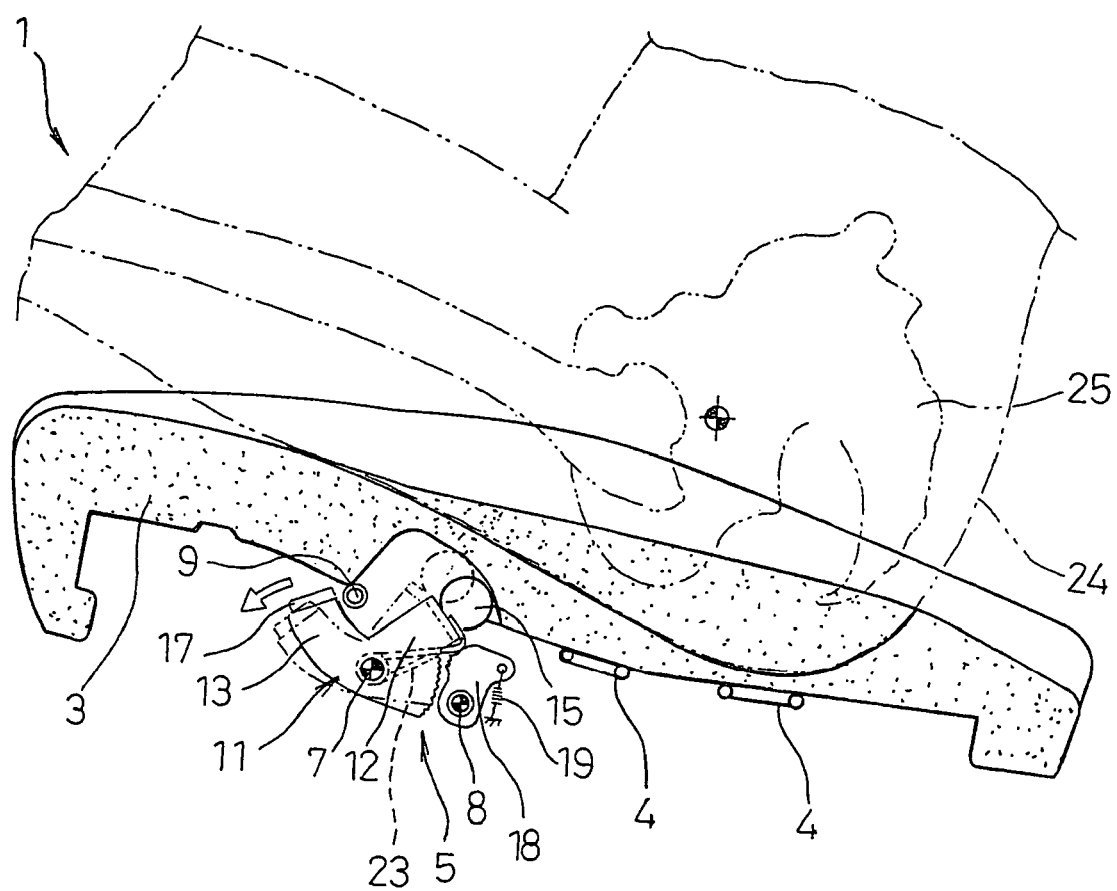
FIG. 1 is a longitudinal cross-sectional side view of a first embodiment of the car seat of the present invention.
Figure 2:
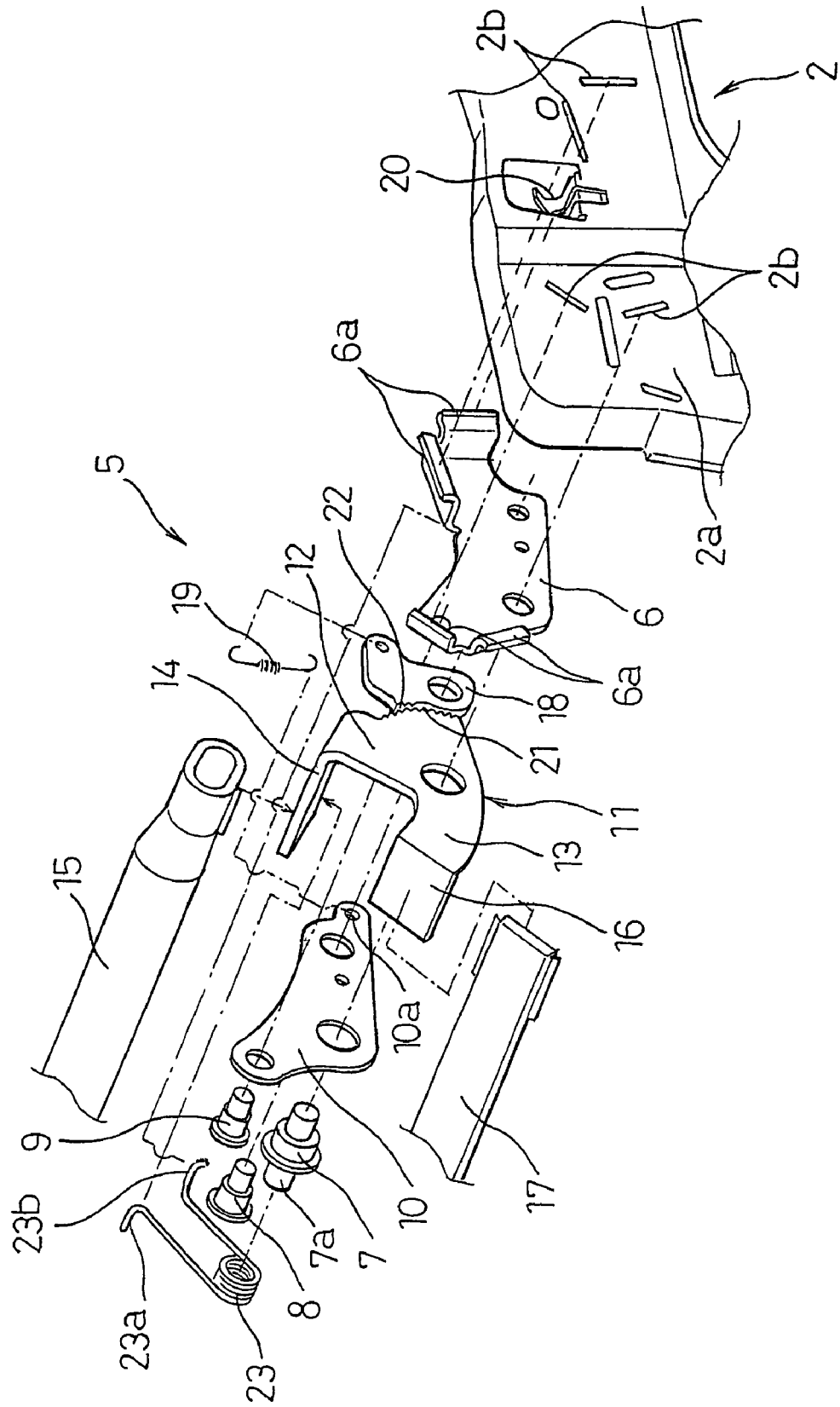
FIG. 2 is an exploded perspective view of the motion restraint device in the same embodiment.

A first embodiment of the present invention is described first with reference to FIG. 1 to FIG. 4. In FIG. 1 and FIG. 2, numeral 1 denotes a car seat cushion, and 2 denotes a steel plate frame part of the seat cushion 1, both sides of which are attached to upper rails of left and right seat rails (not shown). A cushion pad 3 made of, for example, urethane foam is mounted on this frame part 2, and is covered by an outer package material (not shown). A plurality of S springs 4 are stretched at the bottom of the frame part 2 across the side plates, spaced from each other in the front to back direction in the middle and at the rear part in the front to back direction of the vehicle, serving as support spring members for supporting the lower side of the cushion pad 3. In the front part between the side plates of the frame part 2 beneath the cushion pad 3 is provided a motion restraint device 5 which restricts forward movement of the hips of a passenger when the car is suddenly decelerated.

Below, the structure of the motion restraint device 5 will be described in detail. An attachment plate 6 for attaching the motion restraint device 5 has turned attachment lugs 6a at four locations in the periphery, and the turned ends of the lugs are securely joined by welding to the side plate 2a of the frame part 2 at weld points 2b. Opposite and spaced from the inner side of the attachment plate 6 is a holder plate 10, securely retained by three swaged pins, a first pivot pin 7, a second pivot pin 8, and a stopper pin 9. A swing support member 11 and a pendular member 18 are arranged in the gap between these attachment plate 6 and holder plate 10.

The swing support member 11 is pivoted at the center by the first pivot pin 7 such as to be swingable up and down. The swing support member 11 includes a catching member support arm 12 extending diagonally upward and rearward and an inertial mass support arm 13 extending diagonally upward and forward. The distal end of the catching member support arm 12 is turned towards the inside of the seat cushion 1 to form an L-shaped attachment piece 14. A catching member 15, which is composed of a pipe material, is bridged across the attachment pieces 14 of the catching member support arms 12 of the left and right swing support members 11, its both ends being securely joined to the attachment pieces 14 by welding. These catching member support arms 12 and the catching member 15 constitute the catching part, the catching member 15 being supported such as to be movable up and down in the front part inside the seat cushion 1.

Similarly, the distal end of the inertial mass support arm 13 is turned towards the inside of the seat cushion 1 to form an L-shaped attachment piece 16. An inertial mass 17, which is composed of a steel plate, is bridged across the attachment pieces 16 of the inertial mass support arms 13 of the left and right swing support members 11, its both ends being securely joined to the attachment pieces 16 by welding.

The pendular member 18 is arranged at the back of the swing support member 11, and pivoted at the lower end by the second pivot pin 8 such as to be swingable back and forth. A spring 19 that keeps this pendular member 18 in the backwardly swung position is stretched between the upper rear end of the pendular member 18 and a spring retention hole 10a formed at the rear end of the holder plate 10. A stopper piece 20 that restricts the rear swing end of the pendular member 18 extends from the both side plates 2a of the frame part 2.

The lower part of the catching member support arm 12 extends backward, its rear end edge being formed in an arc shape with the center at the axial center of the first pivot pin 7, and with a gear tooth profile 21. The upper front edge of the pendular member 18 has gear teeth 22 that engage with the gear tooth profile 21 when the pendular member swings forward; with these gear tooth profile 21 and gear teeth 22, a ratchet mechanism is formed that allows the catching member support arm 12 to swing upward but stops it from swinging downward. Thus, when the car is suddenly decelerated, the pendular member 18 swings forward by the force of inertia, causing its gear teeth 22 to engage with the gear tooth profile 21 of the catching member support arm 12 of the swing support member 11, thereby stopping the catching member 15 from moving downward.

A torsion spring 23 is arranged around a boss 7a protruded to the inner side of the first pivot pin 7, its one end 23a being engaged with the lower edge of the attachment piece 14 of the catching member support arm 12 and its other end 23b being engaged with the upper edge of the attachment plate 6, so that the catching member 15 is biased toward its upwardly swung position by this torsion spring 23. The upper front swing end of the catching member 15 is restricted by the front end edge of the catching member support arm 12 making contact with the stopper pin 9.

In FIG. 1, numeral 24 represents the hips of the passenger seated on the seat cushion 1, and 25 represents the pelvis.

With the above design, when a passenger sits on the car seat cushion 1 or when s/he operates foot pedals, the cushion pad 3 is compressed and displaced downwards. At the same time, the catching member 15 is pressed down from the state shown by phantom lines to the state shown by solid lines in FIG. 1, and with the swing support member 11 swinging downwardly with ease against the force of the torsion spring 23, the catching member 15 can move down smoothly, so that the passenger does not feel odd and that the seat comfort is not deteriorated.

The pendular member 18 is biased backward by the force of the tension spring 19 and does not swing forward, and therefore a situation will not arise where the catching member 15 is accidentally stopped from moving down during normal use, which will deteriorate the seat comfort.

The catching member 15 that is biased toward the upwardly swung position by the torsion spring 23 has the similar function as the S springs 4, and they all together support the hips 24 of the passenger through a relatively thin cushion pad 3, whereby the entire hips 24 of the passenger are supported with comfortable cushion.

Figure 3A:
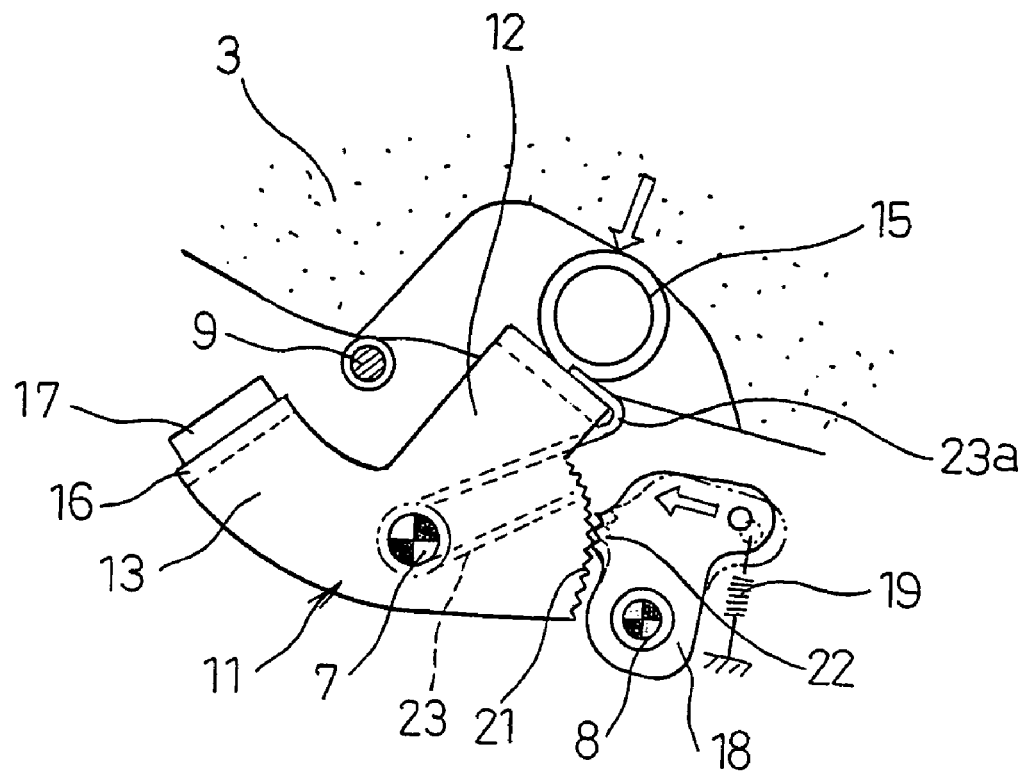
FIG. 3A and FIG. 3B illustrate the actions of the motion restraint device in the same embodiment in a collision, FIG. 3A being a longitudinal cross-sectional side view showing the action at the initial stage of a collision, and FIG. 3B being a longitudinal cross-sectional side view showing the action at a later stage of the collision.

On the other hand, in the event of rapid deceleration caused by a front collision of the car, first in an initial stage, from the state shown by solid lines in FIG. 1, the pendular member 18 swings forward around the second pivot pin 8 against the force of the tension spring 19 as indicated by the arrow in FIG. 3A by the force of inertia, causing its gear teeth 22 at the front edge to engage with the gear tooth profile 21 at the rear edge of the catching member support arm 12, which initiates the action of locking the downward movement of the catching member support arm 12, whereby the catching member 15 is stopped from moving down.

Figure 3B:
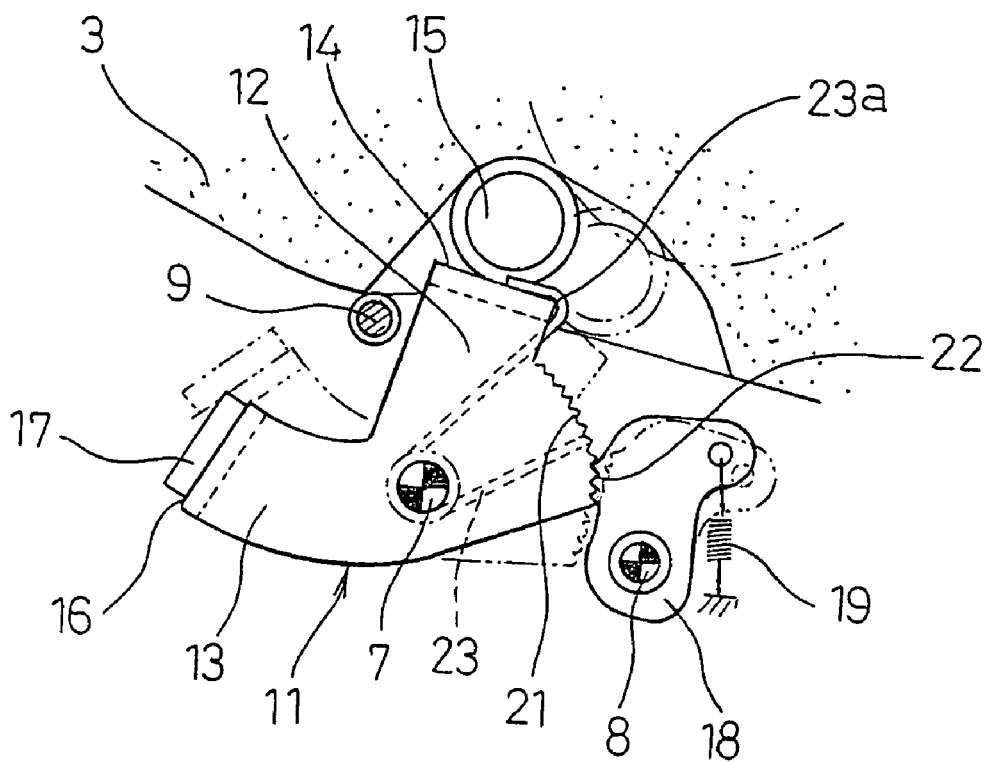

Further, at the peak of rapid deceleration of the car body, the inertial force on the catching member 15 pushes it upward and forward as shown in FIG. 3B, and the forward movement of the inertial mass 17 caused by the inertial force adds a force that acts to push the catching member 15 upward and forward, whereby the catching member 15 is thrust further up and forward.

Thus, a forward movement of the passenger's hips 24 caused by the rapid deceleration is reliably stopped by the catching member 15. Therefore, the forward movement of the passenger is reliably prevented by the catching member 15. Also, when a forward movement of the passenger's hips 24 at the time of rapid deceleration exerts a forward force from the back of the catching member 15, a component of force will act that causes an upward swing of the catching member 15, whereby the forward movement of the passenger's hips 24 is restricted more reliably. Also, a resilient deformation of the catching member 15 absorbs the forward movement energy of the passenger, whereby the forward movement is restricted.

Also, with the above design, no lift-up mechanism or drive means are provided as with the conventional example, and therefore the structure is simple, lightweight, and low-cost.

Figure 4A:
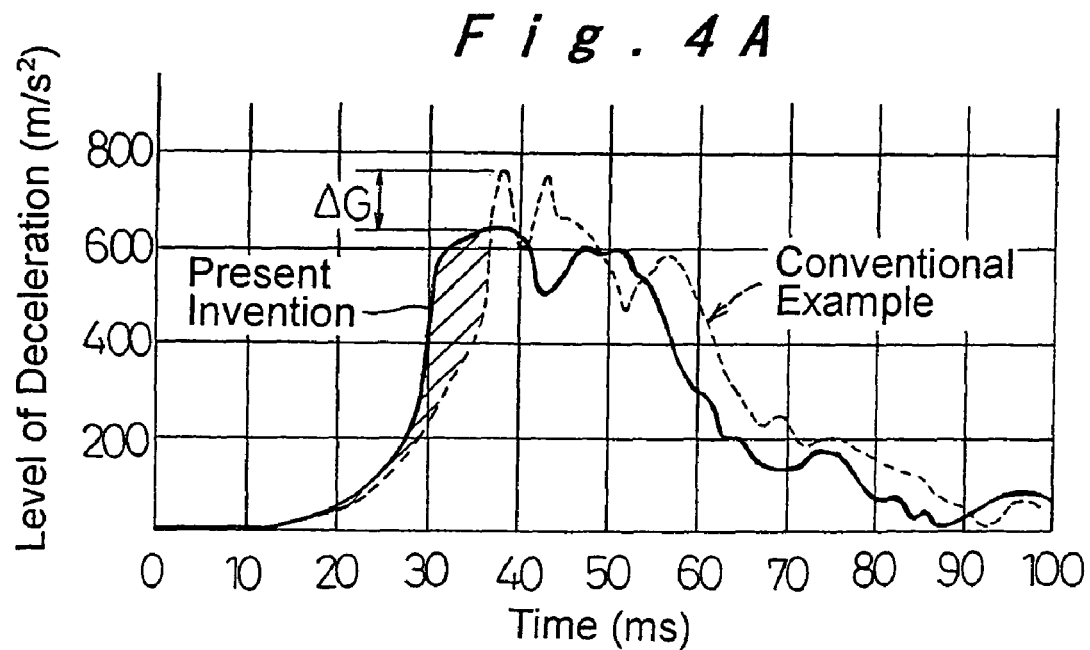
FIG. 4A and FIG. 4B are graphs showing the level of deceleration force applied on a dummy in a collision using the motion restraint device in the same embodiment, the parameters being time and displacement.
Figure 4B:
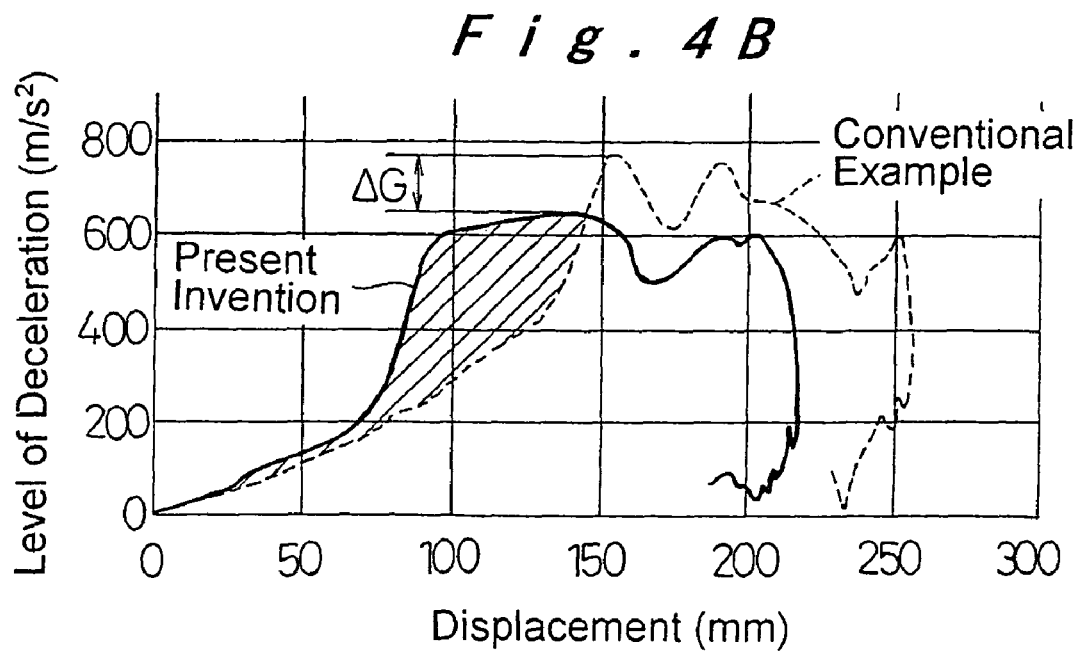

A collision experiment was conducted using dummies on the cars, one installed with the car seat with the motion restraint device 5 of the present invention and the other installed with a conventional car seat without the device; FIG. 4A and FIG. 4B show the level of deceleration applied to the hips of the dummies plotted against time and against displacement. As shown in FIG. 4A, as compared to the conventional example which is plotted with a broken line, with the present invention which is plotted with a solid line, because the forward movement of the hips is effectively restricted, the timing at which the level of deceleration applied to the hips soars is made earlier by 5 to 10 msec than the conventional example, by which the collision energy is absorbed with a longer time as indicated by diagonal lines, and the maximum level of deceleration applied to the hips is reduced by $\Delta G$, which is, for example, about 130 m/s$^2$ with this embodiment. Also as shown in FIG. 4B, similarly to the above, because the forward movement of the hips is effectively restricted, the collision energy is absorbed effectively in the region indicated by diagonal lines where the amount of displacement is lower, by which the peak of the deceleration level is made flat and the maximum amount of displacement is lower, as well as the ultimate amount of displacement is reduced. Thus these energy absorption characteristics in the hip area positively affect the chest area condition and the level of damage to the passenger in a collision is largely reduced.

Figure 5A:
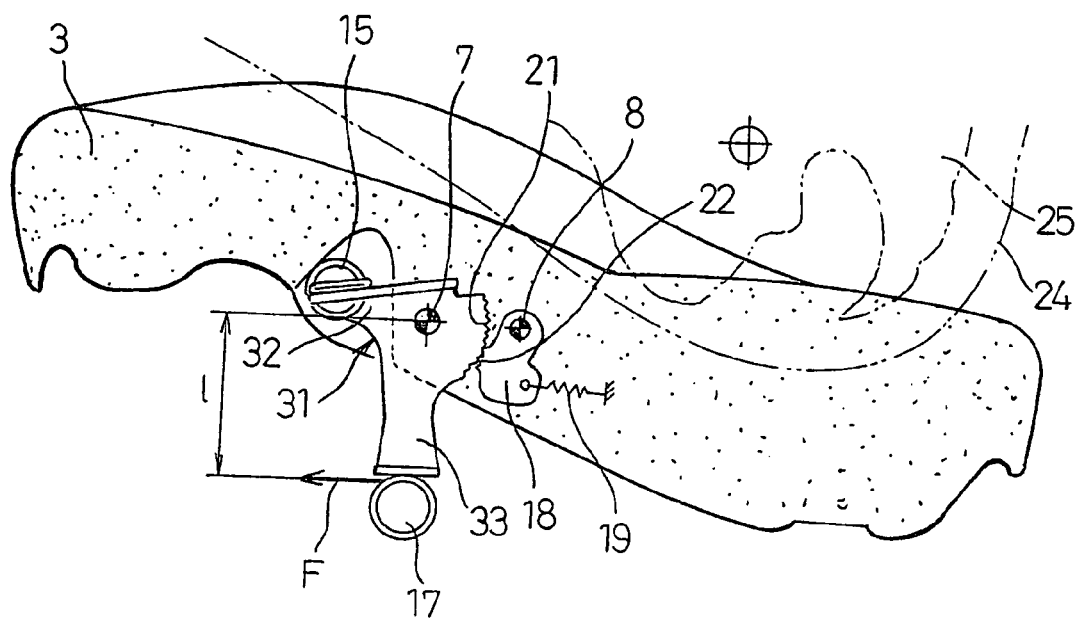
FIG. 5A and FIG. 5B illustrate the actions of a second embodiment of the car seat of the present invention in a collision, FIG. 5A being a longitudinal cross-sectional side view showing the action at the initial stage of a collision, and FIG. 5B being a longitudinal cross-sectional side view showing the action at a later stage of the collision.

Next, a second embodiment of the car seat of the present invention will be described with reference to FIG. 5A and FIG. 5B. Like elements to those of the above-described first embodiment are represented by the identical numerals and will not be described again, and differences only will be described.

While the catching member 15 in the first embodiment was described as being arranged diagonally above in the back of the first pivot pin 7 as one example, the present invention is not necessarily limited to such design or arrangement. This embodiment includes a swing support member 31 having a catching member support arm 32 extending forward and an inertial mass support arm 33 extending downward, and being pivoted at the center by the first pivot pin 7. A catching member 15, which is composed of a pipe material in the illustrated example, is secured to the front end of the catching member support arm 32 of the swing support member 31, and an inertial mass 17, which also is composed of a pipe material in the illustrated example, is secured to the lower end of the inertial mass support arm 33. The rear end of the swing support member 31 protrudes in an arc shape and is formed with a gear tooth profile 21 at its outer edge. A pendular member 18 is arranged behind this gear tooth profile 21, its upper end being supported such as to be swingable around the second pivot pin 8 while the lower part being biased backward by a spring 19, with gear teeth 22 that can engage with the gear tooth profile 21 being provided at the front end in the lower part.

Figure 5B:
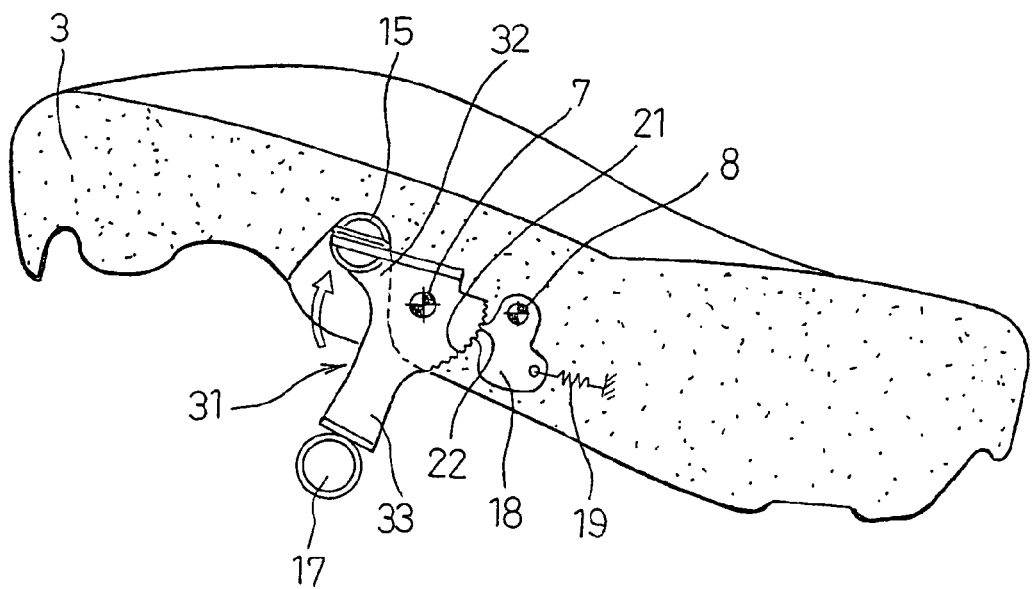

With the design of this embodiment, at the time of rapid deceleration, a rotation moment M acts on the swing support member 31 clockwise, whereby, as shown in FIG. 5B, the catching member 15 is pushed upward as indicated by the white arrow, the rotation moment M being a product of 1 and F, where 1 is the length of the arm between the center of gravity of the inertial mass support arm 33 and the inertial mass 17 and the center of the first pivot pin 7, and F is a rotation force, which is a product of m and $\alpha$, where m is the sum of mass of the inertial mass support arms 33 and the inertial mass 17, and $\alpha$ is the level of deceleration.

Thus, the forward movement of the passenger's hips 24 is reliably restricted by the catching member 15, and the same effects as those of the above-described first embodiment are achieved. Downward displacement of the catching member 15 when the passenger sits on the seat cushion 1 is achieved by a forward and downward swing of the catching member 15, which is done smoothly, and therefore it is less likely that the passenger feels there is something in the seat when seated. Further, because the inertial mass 17 is arranged in a dead space below the seat cushion 1, the inertial mass support arm 33 may be made longer, by which the catching member 15 may be pushed up with a larger force.

Next, a third embodiment of the car seat of the present invention will be described with reference to FIG. 6. Like elements to those of the above-described first embodiment are represented by the identical numerals and will not be described again, and differences only will be described.

Figure 6:
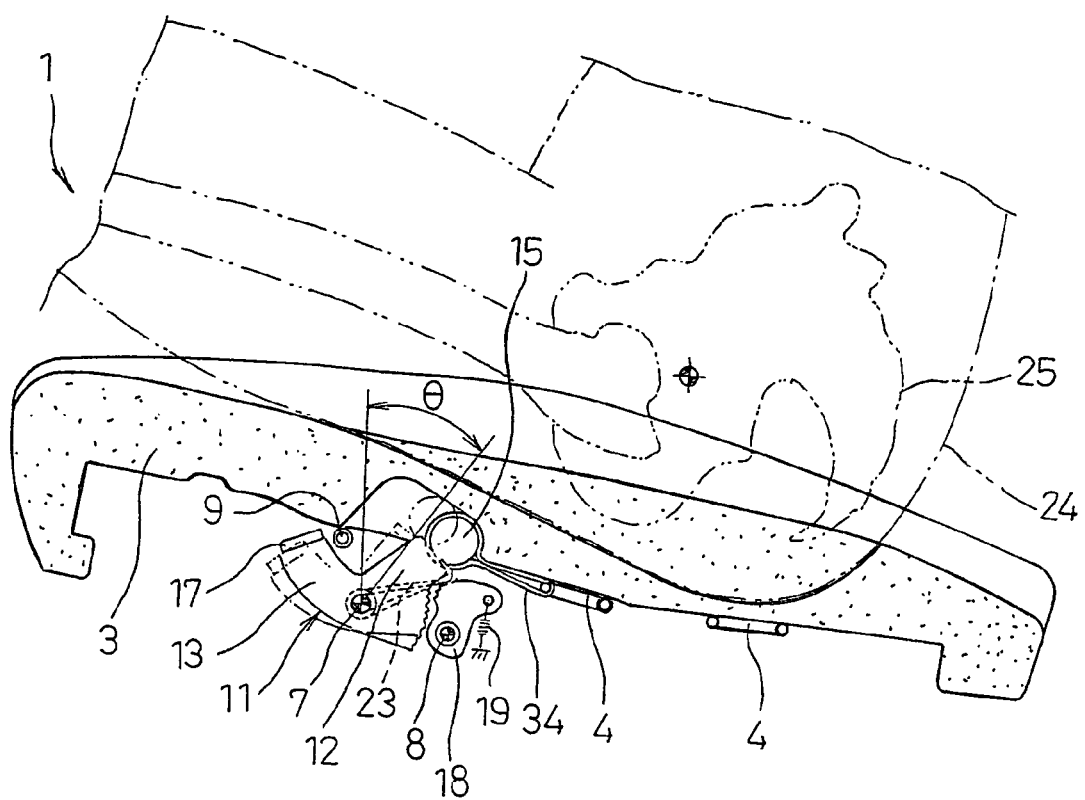
FIG. 6 is a longitudinal cross-sectional side view of a third embodiment of the car seat of the present invention.

In the above-described first embodiment, when the angle $\theta$ made between a vertical line passing the axial center of the first pivot pin 7 and a line that connects the center of the catching member 15 and the axial center of the first pivot pin 7, as shown in FIG. 6, is small, the inertial force that acts on the catching member 15 at the time of rapid deceleration is large, whereby the motion restraint effects are also large. However, when the angle $\theta$ is small, the catching member 15 does not swing downward and rearward smoothly enough when the passenger sits down, so that s/he may feel there is something protruding underneath. To solve this problem, in this embodiment, the catching member 15 and S springs 4 that support the lower side of the cushion pad 3 are coupled with elastic material such as rubber bands 34, which have a smaller maximum tension force than the inertial force that acts during rapid deceleration.

With this embodiment, when the passenger sits on the seat cushion 1, the cushion pad 3 displaces downward, while the S springs 4 flex and pull the catching member 15 downward and rearward through the rubber bands 34, so that it is reliably prevented that the passenger feels there is something underneath when s/he sits down because of the catching member 15. The maximum tension force of the rubber bands 34 is much smaller than the inertial force that acts during rapid deceleration so that the above-described effects are reliably achieved, and therefore the motion restraint performance for the passenger's hips 24 is sufficiently achieved.

Next, a fourth embodiment of the car seat of the present invention will be described with reference to FIG. 7 and FIG. 8A to FIG. 8C. Like elements to those of the above-described first embodiment are represented by the identical numerals and will not be described again, and differences only will be described.

In the above-described embodiments, to prevent downward movement of the catching member 15 that has been moved upward by the swing of the swing support member 11 during rapid deceleration, locking means having a ratchet mechanism, consisting of the pendular member 18, gear tooth profile 21, and gear teeth 22, is provided, as one example. This locking means, however, is activated by inertia, because of which a possibility remains that it may fail to operate. Besides this possible operation unreliability, the ratchet mechanism design has a cost disadvantage because the teeth need to have a predetermined or higher strength. Accordingly, in this embodiment, locking members are provided, which are always kept in contact with the swing support members, and which fit in engagement portions provided to the swing support members when the catching member moves a predetermined distance.

Figure 7:
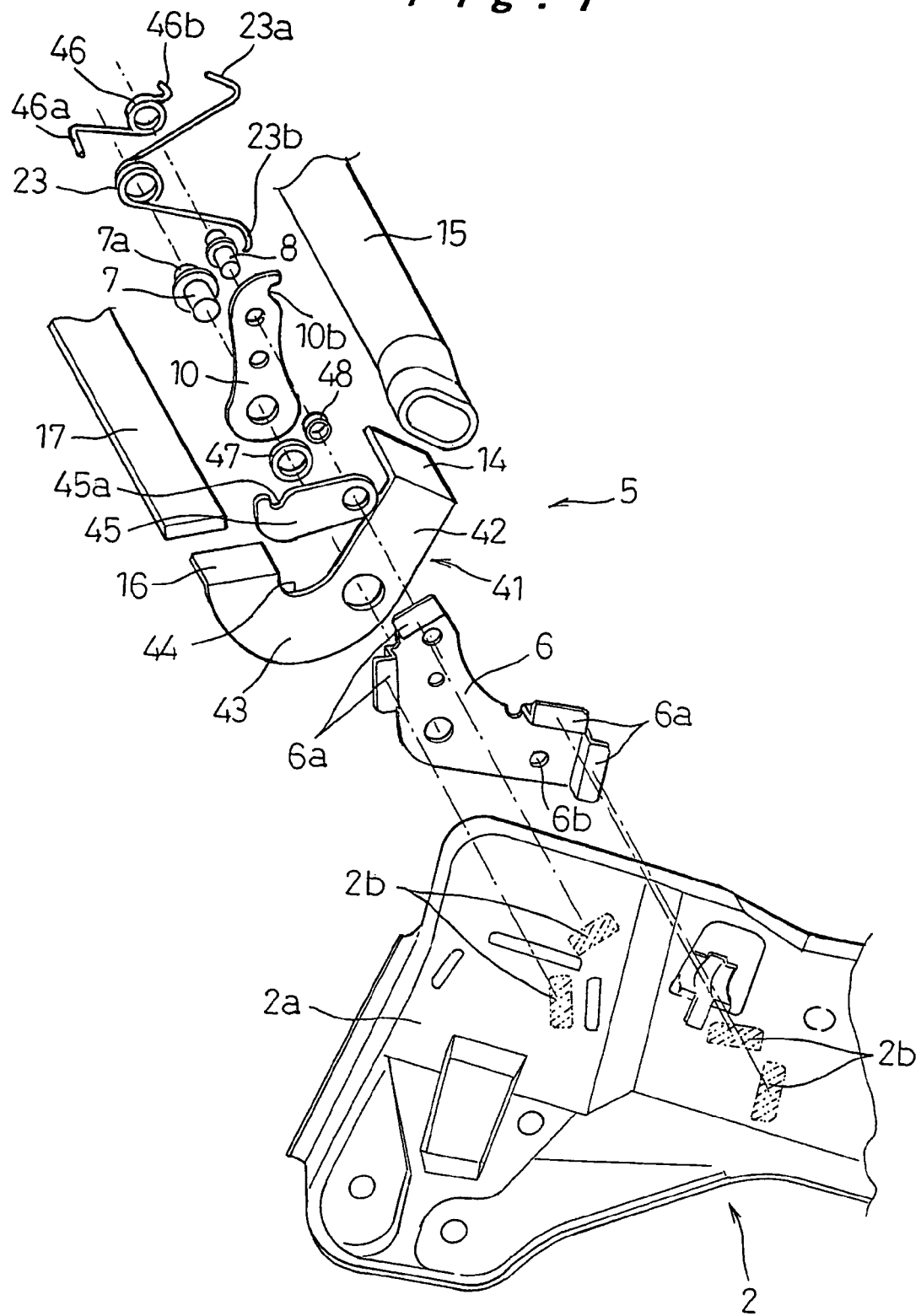
FIG. 7 is an exploded perspective view of the motion restraint device of a fourth embodiment of the car seat of the present invention.
Figure 8A:
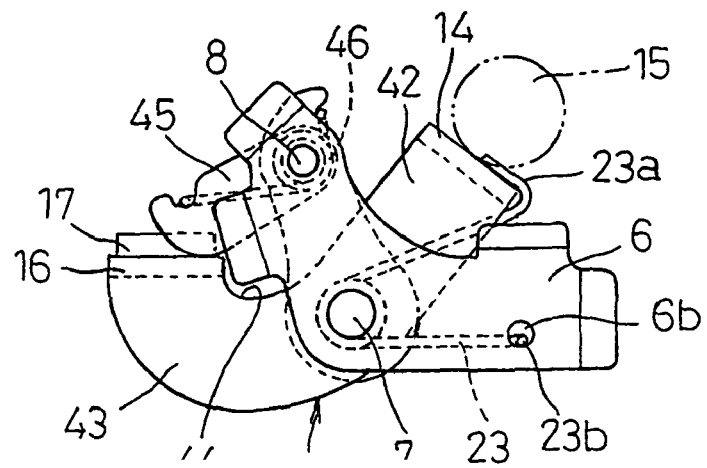
FIG. 8A to FIG. 8C illustrate various states of the motion restraint device of the same embodiment, FIG. 8A being a longitudinal cross-sectional side view showing the normal state, FIG. 8B being a longitudinal cross-sectional side view showing the state in a collision, and FIG. 8C being a longitudinal cross-sectional side view showing the state immediately after a collision.

For further description, referring now to FIG. 7 and FIG. 8A, the swing support member 41 is pivoted at the center by the first pivot pin 7 such as to be swingable up and down. The swing support member 41 includes a catching member support arm 42 extending diagonally upward and rearward from around the first support pin 7, and a substantially J-shaped inertial mass support arm 43 extending diagonally downward and forward from around the first support pin 7 and then curving diagonally upward and forward. The curved dent in the inertial mass support arm 43 forms the engagement portion 44, which is to be engaged with the end of the locking member 45. The locking member 45 is supported such as to be swingable back and forth by the second pivot pin 8 arranged above and forward of the first pin 7, and biased to a swung position where it always makes contact with the swing support member 41 by a torsion spring 46. One end 46a of the torsion spring 46 is engaged with a spring retention notch 45a at the upper front edge of the locking member 45, and the other end 46b is engaged with a spring retention notch 10b at the upper rear edge of the holder plate 10. Numerals 47 and 48 represent bearing components interposed between the pivot pins 7 and 8 and swing support member 41 and locking member 45. In this embodiment, the other end 23b of the torsion spring 23 for biasing the catching member 15 upward is engaged with a spring retention hole 6b in the attachment plate 6.

Figure 8B:
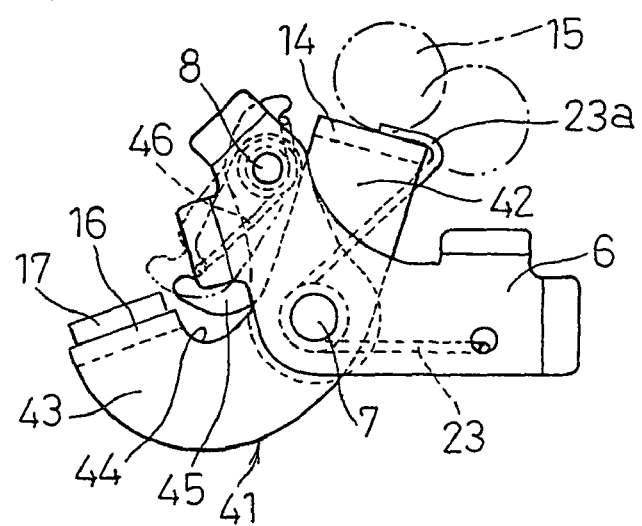
Figure 8C:
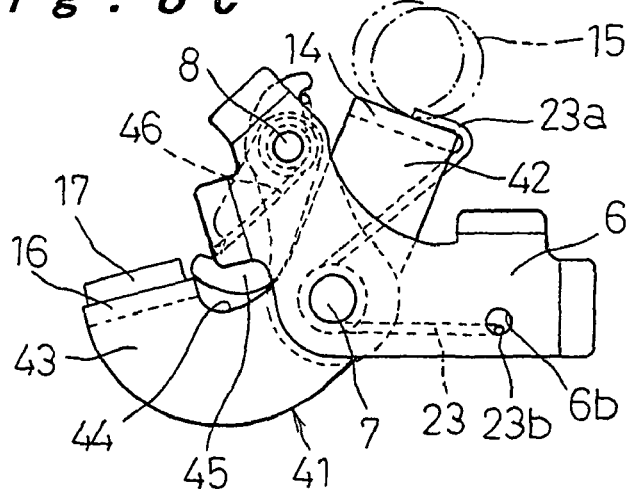

With this embodiment, in normal conditions, the distal end of the locking member 45 is in contact with the distal end surface of the inertial mass support arm 43 as shown in FIG. 8A. At the peak of rapid deceleration, the inertia that acts on the catching member 15 and inertial mass 17 causes the swing support member 41 to swing counterclockwise largely more than a predetermined distance against the force of the torsion spring 23, whereby the catching member 15 moves forward and upward, as shown in FIG. 8B. At the same time, the distal end of the locking member 45 comes out of the distal end surface of the inertial mass support arm 43 and fits in the engagement portion 44, so that the locking member 45 is in contact with the front edge of the catching member support arm 42. As a result, as shown in FIG. 8C, the engagement between the distal end of the locking member 45 and the engagement portion 44 blocks any clockwise movement of the swing support member 41 that may be caused by the changing inertia, and stops it from swinging. Thus the locking effect is reliably achieved.

Thus, as the locking member 45 is always in contact with the swing support member 41, it responds immediately to any sudden swing of the swing support member 41 or a movement of the catching member 15 at the time of rapid deceleration so that the passenger is reliably stopped from moving forward by the catching member 15, and also, since the swing support member 41 and locking member 45 are in contact with each other, the design is compact. Further, the inertial mass support arm 43 of the swing support member 41 is substantially J-shaped, the curved end of the letter J forming the engagement portion 44 to be engaged with the locking member 45, and there is no need of providing an additional component to the swing support member 41 to form the engagement portion 44, whereby the design is made simple and compact. Also, the engagement portion 44 need not have a tooth profile, and since, when engaged, the locking member 45 is subjected to compression force only while the inertial mass support arm 43 is subjected to the reaction force only, the material strength can be reduced, which will be advantageous in terms of cost.

Figure 9A:
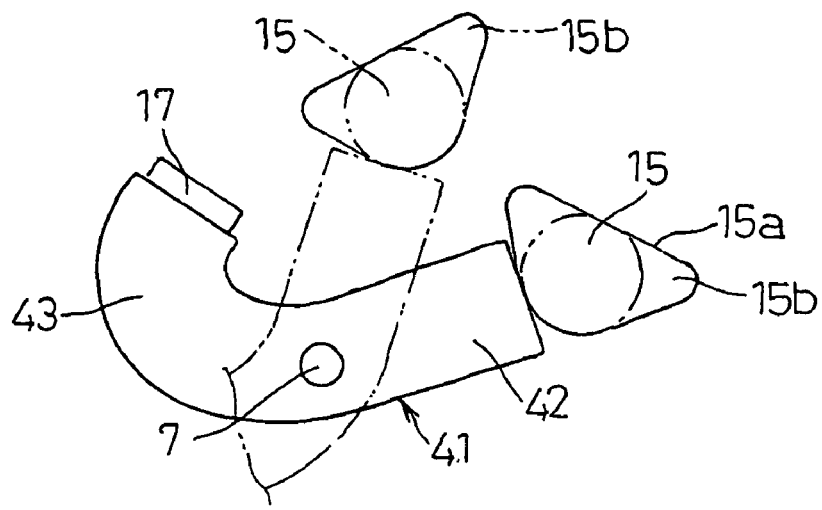
FIG. 9A to FIG. 9C are side views illustrating various examples of modification of the motion restraint device of the fourth embodiment of the car seat of the present invention.

In the above description of various embodiments, the catching member 15 has been described as being composed of pipe material having a circular cross section, as one example. Alternatively, as shown in FIG. 9A, a catching member 15 may be composed of a material having a substantially triangle cross section, being secured to the catching member support arms 42 such as to have a rearwardly protruding part 15b and a flat part 15a generally parallel to the upper surface of the seat in normal conditions. This way, in normal conditions, when the passenger sits down, the flat part 15a making the contact area large eliminates any feeling that there is something underneath, and at the time of rapid deceleration, as indicated by phantom lines, the rearwardly protruding part 15b protrudes upward and stops the forward movement of the passenger even more effectively.

Figure 9B:
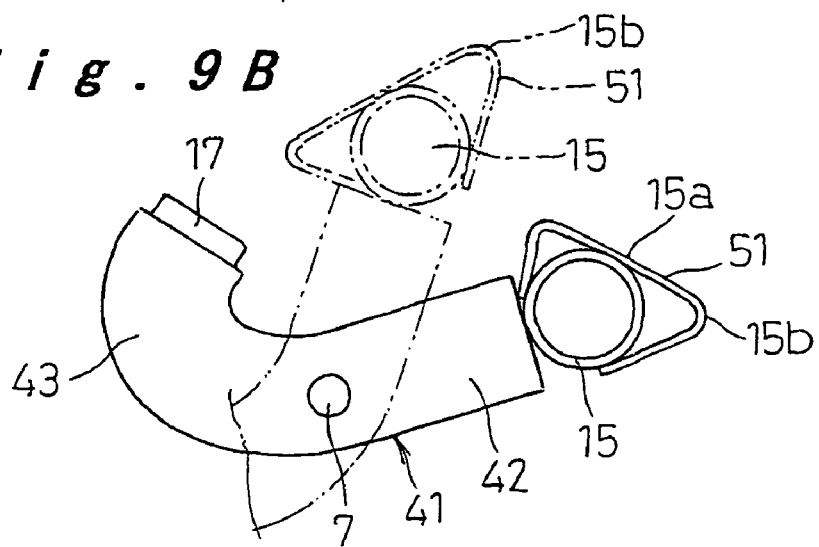
Figure 9C:
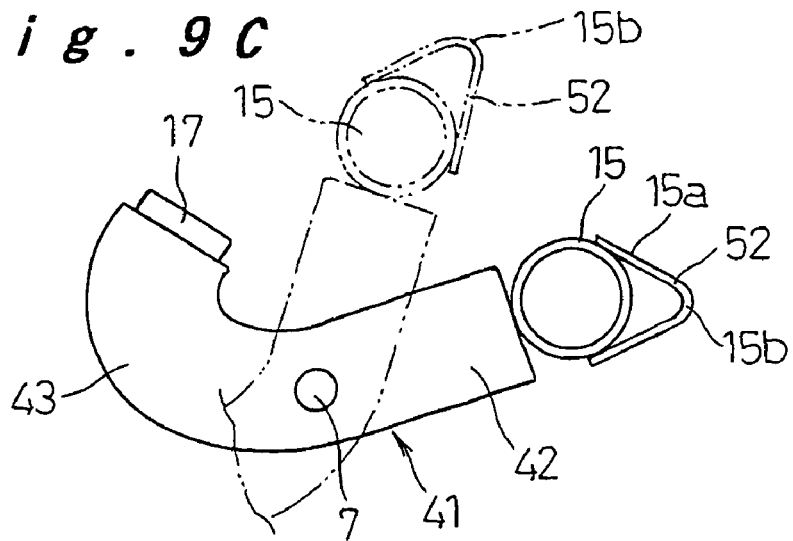

Further, as shown in FIG. 9B, a sheet metal plate 51 formed to have a substantially triangle cross section may be secured to the catching member 15 having a circular cross section so as to form a flat part 15a and a rearwardly protruding part 15b, or, as shown in FIG. 9C, a sheet metal plate 52 formed to have a substantially ridged cross section may be secured to the back of the catching member 15 so as to form a flat part 15a that extends only toward the back and a rearwardly protruding part 15b.

Figure 10A:
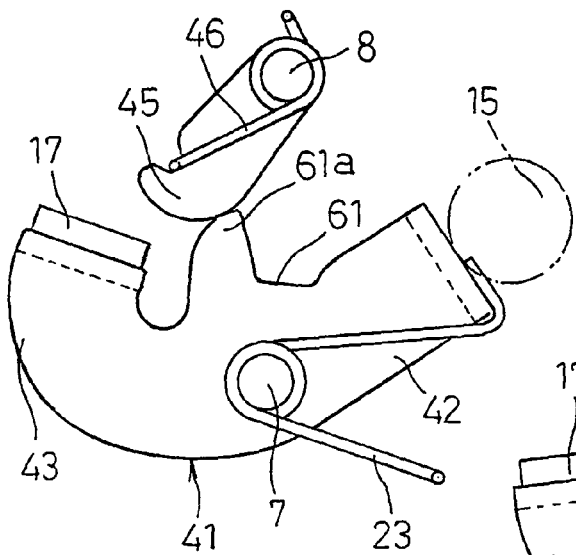
FIG. 10A to FIG. 10D are side views illustrating other examples of modification of the motion restraint device of the fourth embodiment of the car seat of the present invention.

In the above description of various embodiments, the J-shaped inertial mass support arm 43 has been described as having an inside curved dent to form the engagement portion 44 to be engaged with the locking member 45. Alternatively, as shown in FIG. 10A, the swing support member 41 may have, at a suitable position in the front edge, a protrusion 61a to be contacted with the front end of the locking member 45 in normal conditions, and an engagement portion 61 adjacent the back of the protrusion to be engaged with the locking member 45 with the swing of the swing support member 41 at the time of rapid deceleration.

Figure 10C:
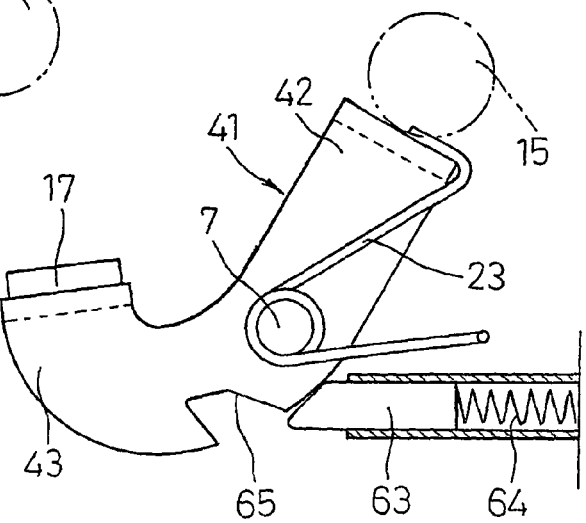
Figure 10B:
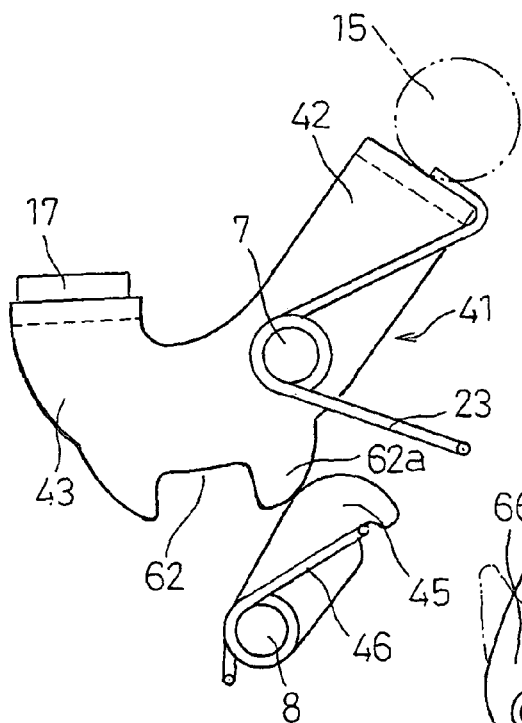

Or, as shown in FIG. 10B, the locking member 45 may be arranged below the swing support member 41 such that its upper part is biased forward, and the swing support member 41 may have, at a suitable position in the lower edge, a protrusion 62a to be contacted with the front end of the locking member 45 in normal conditions, and an engagement portion 61 to the front of the protrusion to be engaged with the locking member 45 with the swing of the swing support member 41 at the time of rapid deceleration.

Or, as shown in FIG. 10C, a locking member 63 may be arranged behind and below the swing support member 41 and biased by a spring 64 to protrude forward and make sliding contact with the rear edge of the swing support member 41, while the swing support member 41 is formed with an engagement portion 65 in the lower part to be engaged with the locking member 63 when the swing support member 41 swings more than a predetermined distance.

Figure 10D:
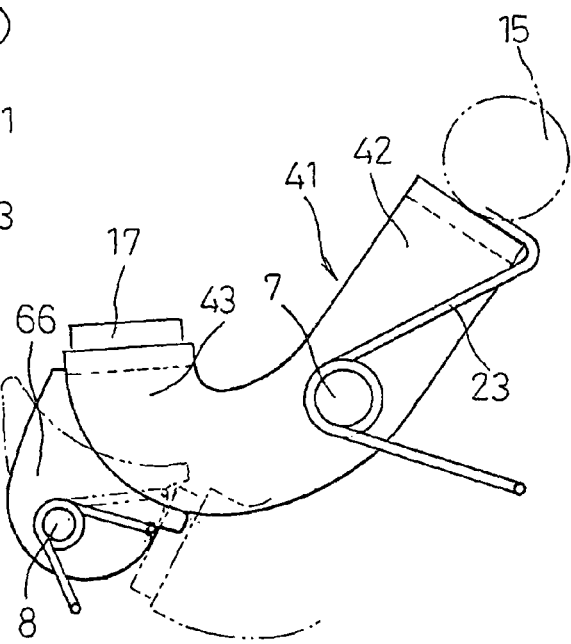

Or, as shown in FIG. 10D, a locking member 66 may be arranged under the swing support member 41 such that its rear part is biased to the upwardly swung position. This locking member 66 is kept in a position where it contacts the lower outer edge of the inertial mass support arm 43 in normal conditions and at the beginning of the swing of the swing support member 41, and when the swing support member 41 swings more than a predetermined distance, the front end of the inertial mass support arm 43 engages with the rear end of the locking member 66.

Examples have been shown in the embodiments described above, wherein various locking means are provided to prevent downward movement of the catching member 15 that has been moved up so that the catching member 15 stays in its upper position and does not return to the lower position, that the passenger's hips are caught in a stable manner, and that the passenger is prevented from moving forward in a reliable manner. It should be noted that the locking means is not essential for the present invention because of the design that causes the catching member 15 to actively move upward by the inertial force generated with rapid deceleration.

INDUSTRIAL APPLICABILITY

As described above, with the car seat of the present invention, the catching part moves down easily when the passenger sits down to secure the seat comfort, while, in the event of rapid deceleration caused by a front collision, the catching part moves up so that it is reliably prevented that the passenger moves forward, and because there are no lift-up mechanism or drive means, the design is simple, lightweight, and low-cost, and therefore it is useful for securing passenger safety in various types of cars.

The invention claimed is:

1. A car seat, comprising
  a catching part being disposed in a front part inside a seat cushion, said catching part extending in a widthwise direction of the seat cushion and mounted so as to be pivotably movable up and down about a pivot axis extending codirectionally with said widthwise direction and from which said catching part is radially spaced apart; and
  an inertial force application mechanism including an inertial mass part, said inertial mass part being mounted for pivotable movement about said pivot axis from which said inertial mass part is radially spaced apart, said inertial mass part being circumferentially spaced apart a fixed distance from said catching part about said pivot axis, said inertial mass part being activated by an inertial force acting directly on said inertial mass part at a time of rapid deceleration operable to pivot the catching part upward.

2. The car seat according to claim 1, wherein:
  the catching part is supported by a reinforcing member inside the seat cushion such that it is swingable up and down around a pivot shaft on a rear side of a vehicle relative to the pivot shaft; and
  the inertial force application mechanism includes the inertial mass part arranged forward of the catching part and the pivot shaft and above the pivot shaft, and a coupling part for connecting the inertial mass part and the catching part.

3. The car seat according to claim 1 or 2, wherein:
  the catching part is coupled to a support spring member that supports a lower side of the seat cushion, using an elastic member having a smaller maximum tension force than the inertial force that acts during the rapid deceleration.

4. The car seat according to claim 1, further comprising a locking mechanism configured to be operable for stopping downward movement of the catching part that is moved upward by the inertial force during the rapid deceleration.

5. The car seat according to claim 1, wherein said catching part includes a pipe material having a circular cross-section.

6. The car seat according to claim 1, wherein said catching part includes a material having a triangular cross-section oriented such that a flat side of said triangular cross-section is parallel to an upper surface of the seat cushion in normal conditions.

7. A car seat, comprising:
a catching part being disposed in a front part inside a seat cushion, said catching part extending in a widthwise direction of the seat cushion and arranged so as to be movable up and down;
inertial force application means for moving the catching part upward when activated by an inertial force at a time of rapid deceleration, said inertial force application means including an inertial mass part disposed forward of the catching part, said inertial force application means being activated by an inertial force acting directly on said catching part and said inertial mass part; and
locking means for stopping downward movement of the catching part that is moved upward by the inertial force during said rapid deceleration, the locking means including a locking member that is always kept in biased surface contact with a support member, the support member coupling and supporting the catching part and the inertial mass part with each other and further including an engagement portion formed to the support member to be engaged with the locking member when the catching part moves more than a predetermined distance when said catching part is moved upward upon activation of said inertial force application means.

8. The car seat according to claim 7, wherein:
the support member has two extensions from a pivot shaft extending respectively toward the catching part side and the inertial mass part side;
a one of said two extensions extending toward the inertial mass part is substantially J-shaped when viewed from one side of the vehicle;
the locking member is arranged on a front side of the vehicle relative to the support member; and
a curved portion at a front end of the J-shaped extension of the support member forms the engagement portion to be engaged with the locking member.

9. The car seat, comprising:
a catching part being disposed in a front part inside a seat cushion, said catching part extending in a widthwise direction of the seat cushion and arranged so as to be movable up and down;
an inertial force application mechanism, including an inertial mass part disposed forward of the catching part, that is activated by an inertial force acting directly on said catching part and said inertial mass part at a time of rapid deceleration operable to move the catching part upward; and
a locking mechanism configured to be operable for stopping downward movement of the catching part that is moved upward by the inertial force during the rapid deceleration, wherein the locking mechanism includes:
a locking member that is maintained in biased contact with a support member, the support member coupling and supporting the catching part and the inertial mass part with each other; and
an engagement portion formed to the support member to be engaged with the locking member when the catching part moves more than a predetermined distance.

10. The car seat according to claim 9, wherein:
the support member has two extensions from a pivot shaft extending respectively toward the catching part side and the inertial mass part side;
a one of the extensions toward the inertial mass part side is substantially J-shaped when viewed from one side of the vehicle;
the locking member is arranged on a front side of the vehicle relative to the support member; and
a curved portion at a front end of the J-shaped one of the extensions of the support member forms the engagement portion to be engaged with the locking member.

11. The car seat, comprising:
a catching part being disposed in a front part inside a seat cushion, said catching part extending in a widthwise direction of the seat cushion and arranged so as to be movable up and down;
an inertial force application mechanism, including an inertial mass part disposed forward of the catching part, that is activated by an inertial force acting directly on said catching part and said inertial mass part at a time of rapid deceleration operable to move the catching part upward; and
a locking mechanism configured to be operable for stopping downward movement of the catching part that is moved upward by the inertial force during the rapid deceleration, wherein the locking mechanism includes:
a support member coupling the catching part and the inertial mass part with each other, said support including gear teeth carried thereon; and
a pendular member having other gear teeth for engaging said gear teeth of said support member when brought out of a normally disengaged state therewith by the rapid deceleration against a bias which operates to maintain the normally disengaged state in the absence of said rapid deceleration, engagement of said gear teeth and said other gear teeth preventing said downward movement of the catching part.

* * * * *